(12) United States Patent
Khan et al.

(10) Patent No.: US 8,065,512 B2
(45) Date of Patent: Nov. 22, 2011

(54) EMBEDDED MEMORY PROTECTION

(75) Inventors: Ata Khan, Saratoga, CA (US); Greg Goodhue, San Jose, CA (US); Pankaj Shrivastava, San Jose, CA (US); Bas Van Der Veer, Fiddletown, CA (US); Rick Varney, Campbell, CA (US); Prithvi Nagaraj, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 698 days.

(21) Appl. No.: 12/064,377

(22) PCT Filed: Aug. 22, 2006

(86) PCT No.: PCT/IB2006/052905
§ 371 (c)(1),
(2), (4) Date: Oct. 24, 2008

(87) PCT Pub. No.: WO2007/023457
PCT Pub. Date: Mar. 1, 2007

(65) Prior Publication Data
US 2009/0222652 A1 Sep. 3, 2009

Related U.S. Application Data

(60) Provisional application No. 60/710,648, filed on Aug. 22, 2005.

(51) Int. Cl.
*G06F 9/00* (2006.01)
*G06F 17/50* (2006.01)
*G06F 9/445* (2006.01)
*G06F 12/00* (2006.01)
*G06F 9/44* (2006.01)
*G06F 7/04* (2006.01)
*G06F 11/00* (2006.01)
*G01R 27/28* (2006.01)

(52) U.S. Cl. ............... 713/2; 713/1; 713/100; 702/119; 703/14; 703/28; 711/103; 711/152; 711/163; 717/124; 726/16; 726/26; 726/34

(58) Field of Classification Search ............... 713/1, 2, 713/100, 182, 192; 702/119; 703/14, 28; 711/103, 152, 163; 717/124; 726/16, 26, 726/34
See application file for complete search history.

(56) References Cited

U.S. PATENT DOCUMENTS

| | | | |
|---|---|---|---|
| 6,976,136 B2 * | 12/2005 | Falik et al. | 711/152 |
| 7,103,782 B1 * | 9/2006 | Tugenberg et al. | 713/194 |
| 7,117,352 B1 * | 10/2006 | Giles et al. | 713/2 |
| 7,337,366 B2 * | 2/2008 | Taniguchi | 714/39 |
| 7,386,774 B1 * | 6/2008 | Chatterjee et al. | 714/726 |
| 7,461,407 B2 * | 12/2008 | Little et al. | 726/27 |
| 7,761,717 B2 * | 7/2010 | Moller et al. | 713/189 |
| 2002/0166061 A1 | 11/2002 | Falik et al. | |

FOREIGN PATENT DOCUMENTS

EP 1276033 A1 1/2003
WO 02093335 A2 11/2002

* cited by examiner

*Primary Examiner* — Stefan Stoynov

(57) ABSTRACT

One embodiment of the present application includes a microcontroller (30) that has an embedded memory (46), a programmable processor (32), and a test interface (34). The memory (46) is accessible through the test interface (34). In response to resetting this microcontroller (30), a counter is started and the test interface (34) is initially set to a disabled state while an initiation program is executed. The test interface (34) is changed to an enabled state—such that access to the embedded memory (46) is permitted through it—when the counter reaches a predefined value unless the microcontroller (30) executes programming code before the predefined value is reached to provide the disabled state during subsequent microcontroller (30) operation.

29 Claims, 2 Drawing Sheets

EMBEDDED MEMORY PROTECTION

The present invention relates to electronic devices, and more particularly, but not exclusively, relates to controlling access to an embedded memory of a microcontroller through JTAG ports.

Security for integrated circuits is becoming of greater interest as they are being applied in more and more security conscious applications. Some examples of such applications are smart cards, cellular telephones and other wireless communication devices, internet communication systems, and the like. It is often desirable to secure against unauthorized access to one or more portions of the integrated circuit. Unauthorized access to programming or other memory contents in such devices has become of particular concern to many application/program developers.

At the same time, there is an interest in allowing for the input and output of information to and from integrated circuits. Indeed, information Input/Output (I/O) is often desired to test, emulate, and debug a given integrated circuit. One common standard used for integrated circuit debug, emulation, and/or testing purposes is JTAG (Joint Test Action Group) IEEE (Institute of Electrical and Electronic Engineers) 1194.1 test access port and boundary scan architecture. In addition to the standard JTAG interface, there are a wide variety of other debug, emulation, and/or test interfaces used for integrated circuits. Unfortunately, input/output terminals for JTAG or other desired interfaces sometimes provide a path for unauthorized access to the integrated circuit. As a result, there often is a competing interest between the desire to secure access to integrated circuitry and the need to provide debug, emulation, and/or test capability. Thus, a demand remains for further contributions in this area of technology.

One embodiment of the present invention is a unique technique for securing access to integrated circuitry. Other embodiments of the present invention include unique devices, methods, systems, and apparatus to control access to the embedded memory of an integrated circuit.

A further embodiment includes: resetting a microcontroller including an embedded memory, a programmable processor, and a test interface operatively coupled to the memory and the processor. In response to being reset, access to the memory through the test interface is disabled, and execution of code, hereafter referred to as reset code, stored in the memory with the processor is started. Memory access through the test interface is later enabled unless execution of the reset code establishes further disabling of the test interface for subsequent microcontroller operation.

Another embodiment includes: initiating operation of a microcontroller including an embedded memory, a programmable processor, and a test interface operatively coupled to the memory and the processor; in response to the initiating, starting a counter, setting the test interface to an initially disabled state to disable access to the memory through the test interface, and executing initiation code with the processor; and upon the counter reaching a predefined counter state, changing the test interface to an enabled state to permit memory access unless execution of the initiation code establishes a further disabled state for subsequent microcontroller operation before the counter reaches the predefined counter state.

Still another embodiment is a microcontroller integrated circuit including a processor, an embedded memory, and a microcontroller test interface operatively connected to the processor and the memory. The microcontroller responds to a reset signal to execute reset operating logic that sets an initial disabled state of the test interface and starts a counter. The initial disabled state prevents access to the memory through the test interface. The processor can execute reset initiation code stored in the memory during the initial disabled state to optionally establish a further disabled state for subsequent microprocessor operation after resetting. The reset operating logic provides an enabled state of the test interface for memory access through the test interface during the subsequent microcontroller operation in response to the counter reaching a predefined counter state unless the further disabled memory access state is established by execution of the initiation code with the processor before the counter reaches the predefined counter state.

Yet another embodiment comprises: starting an initiation operation of a microcontroller that includes an embedded memory, a programmable processor, and a test interface operatively coupled to the memory and the processor; during the initiation operation of the microcontroller, establishing an initial disabled state of the test interface to disable access to the memory through the test interface; during the initial disabled state, executing at least a portion of initiation code stored in the memory with the processor to optionally establish a further disabled state of the test interface; and enabling memory access through the test interface for microcontroller operation after the initiation operation unless the further disabled state is established by execution of the initiation code. The further disabled state denies memory access through the test interface during microcontroller operation after the initiation operation. In one form, the initiation code includes a first portion and a second portion, the establishment of the initial disabled state is performed by executing the first portion, and the executing during the initial disabled state includes executing the second portion.

For a further embodiment, a microcontroller is reset that includes an embedded memory, a programmable processor, and a test interface operatively coupled to the memory and the processor. In response to being reset, reset code stored in the memory is executed with the processor. The initiation code disables access to the memory through the test interface to protect memory contents during microcontroller operation subsequent to the resetting; and during the microcontroller operation subsequent to the resetting, the contents of the memory are changed to enable memory access through the test interface. In one form, the memory contents are changed by erasure. In another form, the contents are alternatively or additionally changed by storing different contents in the memory.

One object of the present invention is to provide a unique technique for securing access to integrated circuitry.

Another object of the present invention is to provide a unique device, method, system, or apparatus to control access to the contents of an embedded memory of an integrated circuit.

Further objects, embodiments, forms, features, benefits, and advantages of the present invention shall become apparent from the description and figures included herewith.

Figure 1:
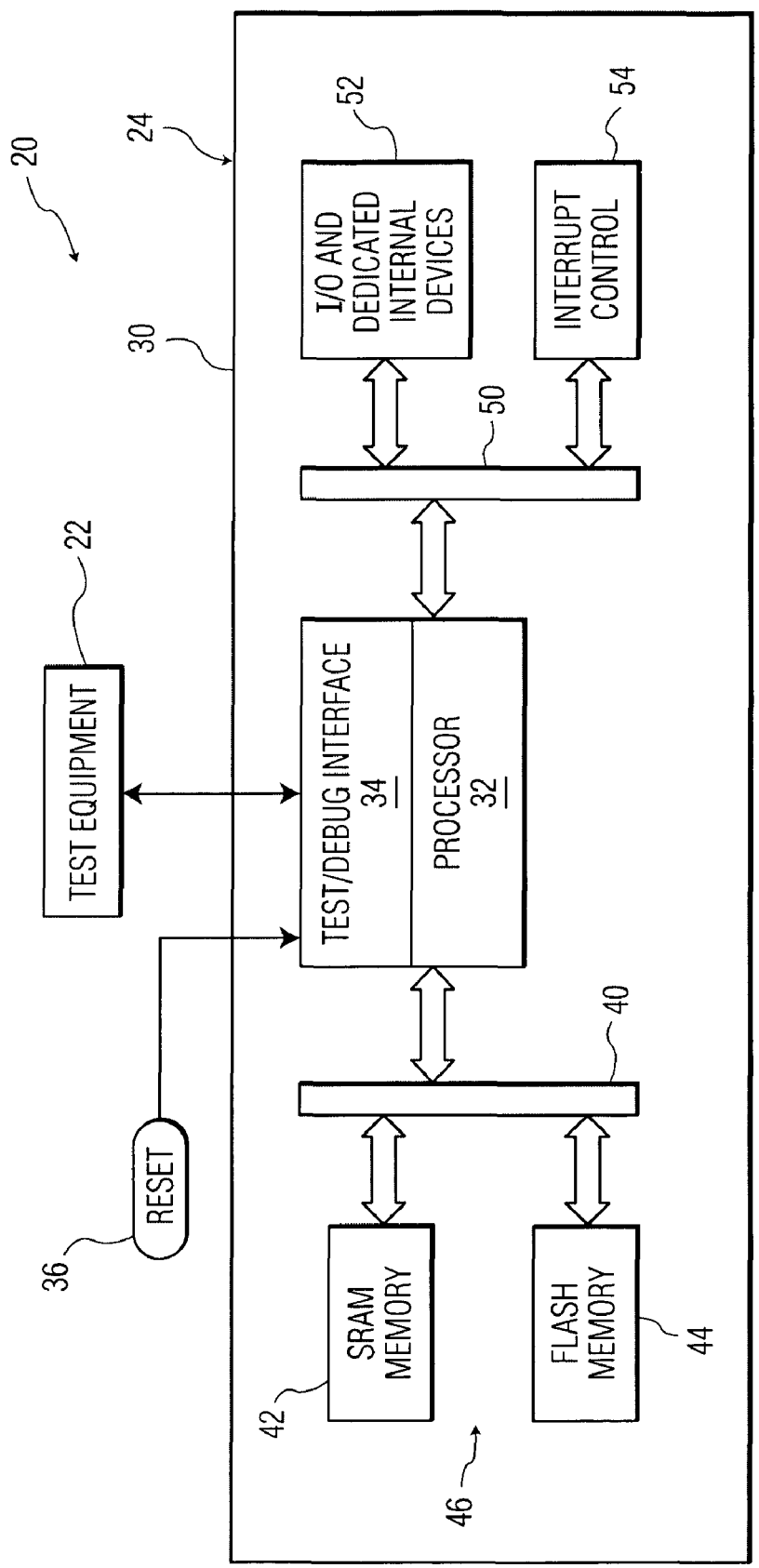
FIG. 1 is a diagrammatic view of an integrated circuit system including a microcontroller coupled to test equipment.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention comprises a microcontroller integrated circuit that includes a processor, an embedded memory operatively coupled to the processor, and a microcontroller test interface operatively connected to the processor and the memory. The microcontroller responds to a reset signal to perform a reset initiation that includes setting a reset disabled state of the test interface and optionally establishing a further disabled state of the test interface. The microcontroller provides an enabled state of the test interface for memory access through the test interface during subsequent operation unless the further disabled state is established by execution of reset initiation code beforehand.

FIG. 1 depicts another embodiment in the form of integrated circuit system 20. System 20 includes test equipment 22 operatively coupled to integrated circuit 24. Integrated circuit 24 is structured to provide microcontroller 30. Microcontroller 30 includes processor 32 and test interface 34. As used herein, "test interface" broadly refers to any integrated circuit interface arranged to provide testing, debugging, emulation, or a combination of these in accordance with one or more established protocols. A given test interface may be accessible through dedicated terminals or may be accessed through terminals shared with one or more other interfaces, devices, or the like of the corresponding integrated circuitry. In one embodiment, interface 34 conforms to the JTAG standard. Alternatively or additionally, a different test interface protocol can be utilized. Philips Semiconductors model LPC2114 and model LPC2124 are nonlimiting examples of microcontroller devices with JTAG and emulation trace port capabilities.

A binary reset input 36 to microcontroller 30 is also shown in FIG. 1. A corresponding reset signal resets operation of microcontroller 30, prompting certain defaults and directing program execution that starts at a predefined boot-up memory location. In response to a reset condition, microcontroller 32 performs a reset initialization as further described hereinafter in connection with FIG. 2. This initialization may be implemented in programming instructions, hardware, or a combination of both.

Processor 32 is further coupled to local bus 40 to provide bidirectional access to embedded Static Random Access Memory (SRAM) memory 42 and embedded nonvolatile flash memory 44. Bus 40 may be coupled to SRAM memory 42 and/or flash memory 44 via memory control logic (not shown) or the like. Memory 44 is typically used to store programming instructions that are executed by processor 32 during microcontroller operation. Memory 44 is structured to be programmed via one or more input ports (such as a serial communication port), and is responsive to a bulk erase command to erase its contents. Erasure of memory 44 can be in response to an external signal, an internal signal, or both in various embodiments. SRAM 42 is provided for data and code storage as desired. Collectively, SRAM 42 and memory 44 comprise embedded microcontroller memory 46.

Microcontroller 30 includes various input devices, output devices, Input/Output (I/O) devices, and/or various different dedicated internal devices that are collectively designated by reference numeral 52. High speed internal bus 50 is coupled to processor 32 and devices 52 to provide selective bidirectional communication therebetween. In one particular form, devices 52 are coupled to bus 50 via an interface bridge (not shown). Devices 52 can include one or more timers, real-time clocks, analog-to-digital (A/D) converters, digital-to-analog (D/A) converters, general purpose I/O pins (GPIO), Universal Asynchronous Receiver/Transmitter (UART) interfacing and/or various other serial communication ports, external interrupt pathways, pulse-width modulation outputs, or the like. Also coupled to bus 50 is interrupt control logic 54. Interrupt control logic 54 manages internal and external interrupts associated with microcontroller 30.

Test equipment 22 is of a type configured to provide appropriate testing, debugging, and/or emulation via interface 34 of microcontroller 30. For example, for a JTAG form of interface 34, test equipment 22 can be any of a number of standard types of JTAG devices. It should be appreciated that while access to microcontroller 30 via test equipment 22 often is desired during initial manufacture, testing, and development; unauthorized access to data stored in memory 42 and/or 44 (such as programming) is often of concern once the programmed part is being provided in a product to the relevant consumer. Indeed, there is often a desire to take measures to prevent a competitor from reading or otherwise gaining access to programming of such parts. Accordingly, microcontroller 30 is structured with suitable operating logic upon reset to provide the program developer the option of whether to disable access to memory or not. Because this option is exercised through user-defined programming, disabling test interface access to memory need not be implemented until after any desired testing/debugging/emulation has been performed to the satisfaction of the manufacturer and/or supplier of the unprogrammed part.

Figure 2:
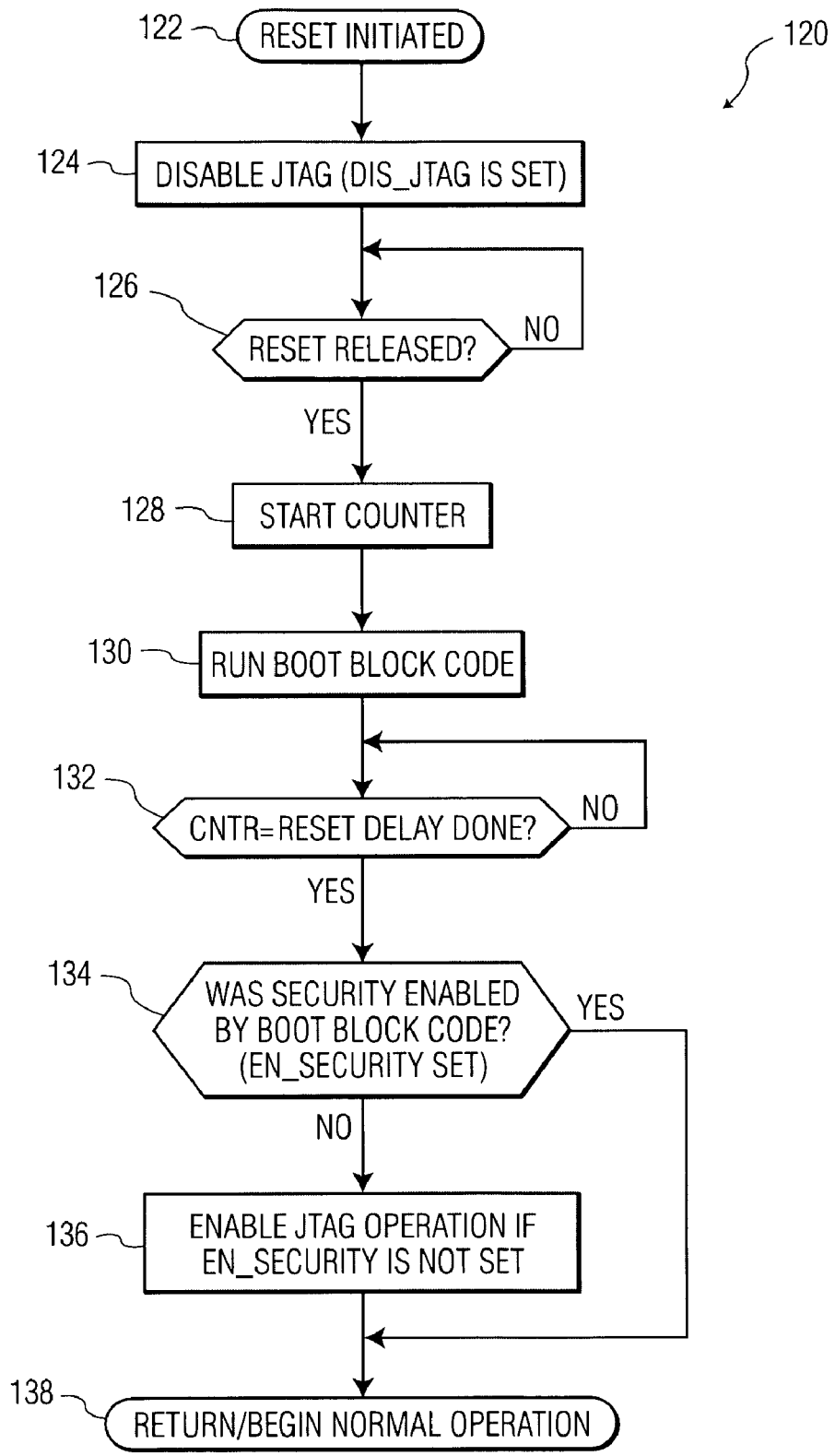
FIG. 2 is a flowchart of one procedure that can be performed with the system of FIG. 1.

One nonlimiting embodiment for optionally disabling test interface 34 of microcontroller 30 is described in connection with procedure 120 illustrated in the flowchart of FIG. 2. For this particular implementation, test interface 34 conforms to a JTAG protocol; however it should be appreciated that a different protocol may alternatively or additionally be applicable in other embodiments. At least some of the operations referenced in connection with procedures 120 are performed through operating logic of microcontroller 30, which may be provided in the form of dedicated hardware, in the form of hardwired or firmware microcontroller instructions, in the form of alterable, memory-stored microcontroller instructions, and/or in a different form as would occur to those skilled in the art.

Procedure 120 begins with operation 122, in which a reset condition is initiated. In operation 122, a binary logical reset signal is set or becomes active through a corresponding change of state at reset input 36. By way of nonlimiting example, a reset signal may result from a power-down/power-on cycle (Power-On Reset—POR) or a power source voltage drop below a predefined threshold as may occur during a brown-out condition (Brown-Out Reset—BOR).

With the reset initiated in operation 122, procedure 120 continues with operation 124, which is performed before the corresponding reset signal is "released"—that is before the reset signal returns to its inactive state. In operation 124, a logical JTAG disable flag, DIS_JTAG, is set corresponding to a JTAG form of interface 34, such that DIS_JTAG=1. With the setting of this flag (DIS_JTAG=1) in operation 124, JTAG functionality of interface 34 is initially disabled. By disabling this functionality, JTAG control of microcontroller 30 is prevented, which includes the ability to access memory 42 or memory 44 via interface 34. This initial disabled state is accomplished through operating logic of microcontroller 30 in response to the reset condition to remove any memory read window that might otherwise result during reset.

From operation 124, procedure 120 continues with conditional 126. Conditional 126 tests whether the reset signal has been released or not. If the reset signal has not been released, corresponding to a negative (false) outcome of the test, conditional 126 loops back to repeat until an affirmative (true) outcome results. Once this affirmative result occurs, procedure 120 enters a reset initiation that begins with operation 128. In operation 128 a digital counter, CNTR, is started that times an initial reset period for microcontroller 30.

From operation 128, procedure 120 continues with operation 130. In operation 130, processor 32 vectors to a reserved reset initiation location in memory 44. If an optional "boot block" of programming instructions (code) is appropriately loaded in memory 44 starting at this reserved location, its execution is performed in operation 130. This code defines a reset initiation that is executed with processor 32. Such reset initiation code is stored as a "block" of contiguous memory locations corresponding to a specified memory address range for the depicted embodiment. Alternatively, the code can be stored in two or more noncontiguous locations of a reserved or unreserved type within memory 42 and/or memory 44. By way of nonlimiting example, a predefined reset initiation location can point to a stored reset routine through indirect addressing or the like. Typically, the reset initiation code is specified by the Original Equipment Manufacturer (OEM) of the microcontroller 30.

During the execution of the reset initiation code, conditional 132 of procedure 120 is executed from time-to-time to test whether the counter CNTR, as initiated in operation 128, has reached a predefined counter state. This predefined state corresponds to a period of time selected to provide a reset delay that encompasses at least an initial portion of the execution time of the reset initiation code (when present). In one form, this predefined counter state is a digitally-defined value that is compared to a digital output of counter CNTR during each execution of conditional 132. Counter CNTR can be provided in a hardware device or logical software form, in the form of a timer internal to microcontroller 30 (such as a timer included in devices 52 or a dedicated hardware and/or software timer that is not user accessible), or as an external counting device or counter signal provided to microcontroller 30—to name just a few examples. Operation 128 and conditional 132 are implemented through microcontroller operating logic in the depicted embodiment.

If the test of conditional 132 is negative (false)—such that counter CNTR has not reached the predefined counter state—then conditional 132 loops back to repeat itself until counter CNTR reaches the predefined counter state. Once this state is reached, the test of conditional 132 is affirmative (true), and procedure 120 continues with conditional 134. Conditional 134 tests whether execution of the boot block code (when present) or reset initiation has set a security flag, EN_SECURITY, during operation 130 before counter CNTR reached the predefined counter state. The setting of security flag EN_SECURITY (EN_SECURITY=1) is an option set by execution of the reset initiation code as defined by the code developer. Typically, development of this code is performed by the Original Equipment Manufacturer (OEM) of the microcontroller component. As the reset initiation code is executing, security flag EN_SECURITY can be set through any of a number of techniques, such as an external signal input, contents of a specified memory location, a checksum of the content of several memory locations, or other operation/function that is acceptably secure.

If the test of conditional 134 is negative (false)—that is security flag EN_SECURITY was not set during the execution of the boot block of operation 130 before conditional 132 was true (EN_SECURITY=0)—then procedure 120 proceeds with operation 136. In operation 136, the JTAG functionality of interface 34 is enabled, including the ability to access memory 42 and/or memory 44 through this test interface port. This enabled state of interface 34 in operation 136 effectively removes the initially disabled state of interface 34 set in operation 124. Microcontroller 30 then proceeds or returns to normal operation from reset procedure 120 in stage 138.

On the other hand, if the test of conditional 134 is affirmative (true)—that is security flag EN_SECURITY was enabled during the execution of the boot block of operation 130 before conditional 132 was true (EN_SECURITY=1)—then procedure 120 loops around operation 136 to proceed directly to stage 138. Because operation 136 is bypassed, the disabled state of interface 34 persists for subsequent microcontroller operation from stage 138. Accordingly, procedure 120 responds to the affirmative setting of security flag EN_SECURITY by establishing a further disabled state of interface 34, which includes the denial of memory access. Conditional 134 and operation 136 are implemented through microcontroller operating logic for the depicted embodiment.

Operation 138 corresponds to the subsequent nominal operation of microcontroller 30 with the test/debug interface 34 disabled. From operation 136, procedure 120 also continues with operation 138 to return or begin normal operation of microcontroller 30 with the corresponding interface 34 in an enabled state.

The establishment of a disabled or enabled state of test interface 34 and/or memory access as previously described can be performed by taking action to impose a change that causes the given state to be set, or allowing a state to persist or change by omission of a given corresponding action. It should be appreciated that the features of procedure 120 include disabling access through interface 34 upon reset to prevent unauthorized assertion of control through interface 34 during a reset condition. The initial disabled state is provided by operating logic of microcontroller 30 for the embodiment described in connection with procedure 120; however, it can be provided by user code (such as user-specified reset code) or in a different manner in other forms. By establishing a delay period with counter CNTR, a user-defined reset program block can selectively initiate further disabling of interface 34, recognizing interface 34 will be enabled by default after the counter delay unless such initiative is taken. In the absence of the optional reset initiation code, it should be understood that this default enablement of interface 34 also occurs. Accordingly, control and/or access to microcontroller 30 can be gained through JTAG operations via interface 34 during manufacture, testing, and development as long as the reset initiation code is absent, and/or opts out of setting security flag EN_SECURITY when it is present.

On rare occasions, it may be desirable to perform internal testing, debugging, emulation, or the like of an earlier programmed microcontroller 30 for which EN_SECURITY has already been set to nominally prevent access via interface 34 (EN_SECURITY=1). For example, such desires may arise in connection with the return of one or more programmed microcontrollers 30 to the OEM by the product/code developer for failure analysis. In such a case, access via interface 34 can be re-established by altering the memory contents being protected through the further disabled state of interface 34. In one nonlimiting example, this alteration is accomplished by a bulk erase command or input signal that destroys the contents of the memory locations, thus continuing protection of such contents from unauthorized access. Alternatively or additionally, this alteration can be implemented by rewriting at least a portion of the stored reset initiation code and/or any memory location referenced to set the security flag EN_SECURITY during operation 130. In one instance, a serial communication device included in devices 52 provides a write-only access to memory 42 and memory 44 through which such alteration can occur. In this manner, the contents of memory 42 and memory 44 can be protected at the option of the programmer, until such time (if any), that testing and debugging of the device is further required; and even then protection continues because the alteration needed to enable test interface access simultaneously changes the content being protected.

Many other embodiments of the present application are envisioned. For example, the teachings of the present application can be applied in other types of integrated circuits besides microcontrollers. Alternatively or additionally, other types of memory access control can be utilized. Another example is an apparatus, comprising: a microcontroller that includes an embedded memory, a programmable processor, and a test interface operatively coupled to the memory and the processor. The microcontroller further includes means for establishing an initial disabled state of the test interface to disable access to the memory through the test interface during an initiation operation; means for executing at least a portion of reset code stored in the memory with the processor to optionally establish a further disabled state of the test interface during the initial disabled state; and means for enabling memory access through the test interface for microcontroller operation after the initiation operation unless the further disabled state is established by execution of the reset code. The further disabled state disables memory access during the microcontroller operation after the initiation operation. In one form, the reset code includes a first portion and a second portion, the establishment of the initial disabled state is performed by executing the first portion, and the executing means executes the second portion.

Still another example is an apparatus including a microcontroller with an embedded memory, a programmable processor, and a test interface operatively coupled to the memory and the processor. The microcontroller includes means for executing reset initiation code stored in the memory with the processor in response to resetting the microcontroller. The initiation code disables access to the memory through the test interface to protect memory contents during microcontroller operation subsequent to being reset. The microcontroller further includes means for changing the contents of the memory to enable access to the memory through the test interface after the microcontroller operation subsequent to resetting.

In a further example, an apparatus includes a microcontroller with an embedded memory, a programmable processor, and a test interface operatively coupled to the memory and the processor. The microcontroller includes: means for resetting operation of the microcontroller, means for starting a counter and setting the test interface to a reset disabled state while an initiation program is executed by the microcontroller in response to the resetting means, and means for changing the test interface to an enabled state for subsequent microcontroller operation when the counter reaches a predefined value unless the microcontroller executes programming code that establishes a further disabled state before the predefined value is reached. The further disabled state denies memory access through the test interface during the subsequent microcontroller operation.

In yet another example, an apparatus includes a microcontroller with an embedded memory, a programmable processor, and a test interface operatively coupled to the memory and the processor. The microcontroller includes: means for resetting, means for disabling access to the memory through the test interface in response to the resetting means, means for executing reset initiation code stored in the memory with the processor after the test interface is disabled with the disabling means, and means for enabling memory access through the test interface unless the execution of the reset initiation program establishes further disabling of the test interface for subsequent microcontroller operation.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
    resetting a microcontroller including an embedded memory, a programmable processor, and a test interface operatively coupled to the memory and the processor;
    in response to the resetting, disabling access to the memory through the teat interface;
    after the disabling, starting execution of reset code stored in the memory with the processor; and
    enabling the access to the memory through the test interface unless the execution of the reset code establishes further disabling of the test interface for subsequent microcontroller operation.

2. The method of claim 1, which includes starting a counter before the execution of the reset code is started.

3. The method of claim 2, which includes comparing a predefined value to an output value of the counter and delaying the enabling until the output value of the counter reaches the predefined value.

4. The method of claim 1, wherein the further disabling is established by the execution of the reset code to protect contents of the memory from being read through the test interface during the subsequent microcontroller operation.

5. The method of claim 4, which includes altering the contents of the memory during the subsequent microcontroller operation to gain memory access through the test interface.

6. The method of claim 5, wherein the altering includes at least one of erasing the memory and storing different contents in the memory through an external memory port.

7. The method of claim 1, wherein the test interface is operable to perform STAG operations when enabled.

8. A method, comprising:
    initiating operation of a microcontroller including an embedded memory, a programmable processor, and a test interface operatively coupled to the memory and the processor;
    in response to the initiating, starting a counter, setting the test interface to an initially disabled state to disable access to the memory through the test interface, and executing initiation code with the processor; and
    if the counter reaches a predefined counter state, changing the test interlace to an enabled state to enable the access to the memory unless execution of the initiation code establishes a further disabled state for subsequent microcontroller operation before the counter reaches the predefined counter state.

9. The method of claim 8, wherein the counter is a timer and the predefined counter state is a predefined amount of time and the setting of the initially disabled state is performed by operating logic of the microcontroller before the execution of the initiation code.

10. The method of claim 8, which includes accessing the microcontroller with external equipment coupled to the test interface in accordance with a JTAG protocol.

11. The method of claim 8, wherein the further disabled state is established by the execution of the initiation code to protect contents of the memory from being read through the test interlace during the subsequent microcontroller operation.

12. The method of claim 11, which includes altering the contents of the memory during the subsequent microcontroller operation to gain memory access through the test interface.

13. The method of claim 12, wherein:
the altering includes at least one of: erasing the memory and storing different contents in the memory; and
the initiation code is stored in a predefined portion of the memory and the memory is nonvolatile.

14. The method of claim 13, wherein the access to the memory is enabled in response to the counter reaching the predefined counter state when no initiation code is stored in the memory.

15. Apparatus, comprising: a microcontroller integrated circuit including a processor, an embedded memory operatively coupled to the processor, a microcontroller test interface operatively connected to the processor and the memory, the microcontroller being responsive to a reset signal to execute reset operating logic operable to set an initial disabled state of the test interface and start a counter, the initial disabled state preventing access to the memory through the test interlace, the processor being operable to execute reset code stored in the memory during the initial disabled state to optionally establish a further disabled state for subsequent microprocessor operation after resetting, the reset operating logic providing an enabled state of the test interface for memory access through the test interface during the subsequent microcontroller operation in response to the counter reaching a predefined counter state unless the further disabled memory access state is established by execution of the initiation code with the processor before the counter reaches the predefined counter state.

16. The apparatus of claim 15, wherein the reset operating logic sets the initial disabled state before the execution of the initiation code with the processor starts.

17. The apparatus of claim 15, wherein the microcontroller includes means for performing input and output operations with external equipment in accordance with a JTAG protocol.

18. The apparatus of claim 15, wherein the microcontroller is responsive to one or more external signals to alter contents of the memory after the further disabled memory, access state is set to alter contents of the memory and enable memory access through the test interface.

19. The apparatus of claim 15, wherein the microcontroller) includes means for changing contents of the memory after the further disabled state is set by the execution of the initiation code.

20. The apparatus of claim 15, wherein the memory is of a nonvolatile flash type.

21. A method, comprising:
starting an initiation operation of a microcontroller, the microcontroller including an embedded memory, a programmable processor, and a test interface operatively coupled to the memory and the processor;
during the initiation operation of the microcontroller, establishing an initial disabled state of the test interface to disable access to the memory through the test interface;
during the initial disabled state, executing at least a portion of initiation code stored in the memory with the processor to optionally establish a further disabled state of the test interface; and
enabling memory access through the test interface for microcontroller operation after the initiation operation unless the further disabled state is established by execution of the initiation code, the further disabled state disabling the memory access through the test interface during the microcontroller operation after the initiation operation.

22. The method of claim 21, wherein the initial disabled state is performed by dedicated operating logic of the microcontroller.

23. The method of claim 22, which include operating a counter during the initiation operation of the microcontroller.

24. The method of claim 23, wherein the further disabled state is provided by inhibiting the enabling with a security setting established by the executing of the initiation code before a predefined counter state is reached by the counter.

25. The method of claim 21, wherein the initiation code includes a first portion and a second portion, the establishing of the initial disabled state is performed by executing the first portion, and the executing at least the portion of initiation code includes executing the second portion.

26. A method, comprising:
resetting a microcontroller including an embedded memory, a programmable processor, and a test interface operatively coupled to the memory and the processor
in response to the resetting, executing reset code stored in the memory with the processor, an initiation code disabling access to the memory through the test interface to protect memory contents during microcontroller operation subsequent to the resetting;
establishing an initial disabling state of the test interface in response to the resetting before the executing is performed; and
during the microcontroller operation subsequent to the resetting, altering the contents of the memory to enable access to the memory through the test interface.

27. The method of claim 26, which includes starting a counter in response to the resetting before the executing is performed.

28. The method of claim 26, wherein the altering includes erasing the contents of the memory.

29. The method of claim 26, wherein the altering includes storing different contents in the memory.

* * * * *